May 19, 1925.

J. A. JOHNSON

RATCHET CRANK

Filed Nov. 1, 1924

1,538,702

INVENTOR.
John A. Johnson,
BY
Geo. P. Kimmel. ATTORNEY.

Patented May 19, 1925.

1,538,702

UNITED STATES PATENT OFFICE.

JOHN A. JOHNSON, OF PITTSBURG, KANSAS.

RATCHET CRANK.

Application filed November 1, 1924. Serial No. 747,354.

*To all whom it may concern:*

Be it known that I, JOHN A. JOHNSON, a citizen of the United States, residing at Pittsburg, in the county of Crawford and State of Kansas, have invented certain new and useful Improvements in Ratchet Cranks, of which the following is a specification.

This invention relates to a hand crank and pertains particularly to a class of reversible ratchet cranks.

The ratchet crank embodying this invention is intended for use primarily upon drills used by miners, although it is to be understood that it is not confined to such use, but may be used wherever applicable, and the object of the invention is to provide, in a manner as hereinafter set forth, a ratchet crank for use upon the thread bar of a drilling machine, and so constructed that when the drilling machine is used in narrow work, it will not be necessary for the miner to remove the crank from the thread bar each time that a half turn is given to the drill. With a ratchet crank of this type a miner can continuously work his drill without having to remove the crank from the thread bar.

A further object of the invention is the provision, in a manner as hereinafter set forth, of a ratchet crank so constructed that it can be reversed when it is desired to remove a drill which has gotten stuck and which must be turned backward to loosen it from the work.

A further object of the invention is the provision, in a manner as hereinafter set forth, of a reversible ratchet crank having nut and bolt head engaging means associated therewith, in a manner hereinafter to be set forth.

A final object of the invention is the provision, in a manner as hereinafter set forth, of a reversible ratchet crank of light but strong and durable construction, easy and efficient in action, adapted for quick and easy application and removal, and inexpensive to manufacture.

The invention will be best understood from a consideration of the following detailed description taken in connection with the accompanying drawings forming a part of this specification, with the understanding that the invention is not confined to any strict conformity with the showing of the drawings but may be changed and modified so long as such changes and modifications mark no material departure from the salient features of the invention as expressed in the appended claims.

In the drawings:—

Figure 3:
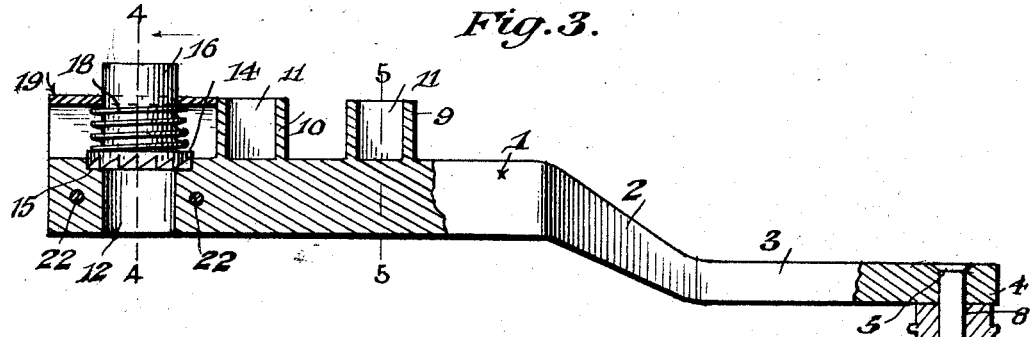
Figure 3 is a side elevation, partly in longitudinal section.
Figure 4:
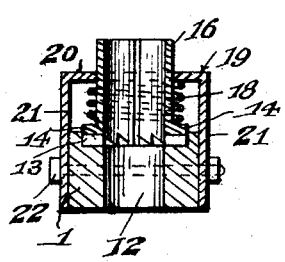
Figure 4 is a section taken upon the line 4—4 of Figure 3.
Figure 5:
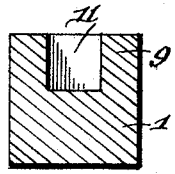
Figure 5 is a section taken upon the line 5—5 of Figure 3.
Figure 6:
Figure 6 is a detailed transverse section through the shank of the device.

Referring now to the drawings in detail wherein like numerals of reference indicate corresponding parts throughout the several views, the device embodying this invention comprises a main shank member indicated generally by the numeral 1, which shank member is constricted and bent obliquely at its central portion, as indicated at 2, which reduced portion merges into a reduced terminal extension 3, provided at outer end with an enlarged head 4, through which an aperture 5 is formed. A handle 6 is secured at right angles to and against the face of the enlarged portion 4 and this handle 6 has passed through the longitudinal center thereof a securing bolt 7, the inner end or head 8 of which is countersunk in the opposite face of the head, as shown in Figure 3, to secure the handle 6 in position against the shank.

Figure 1:
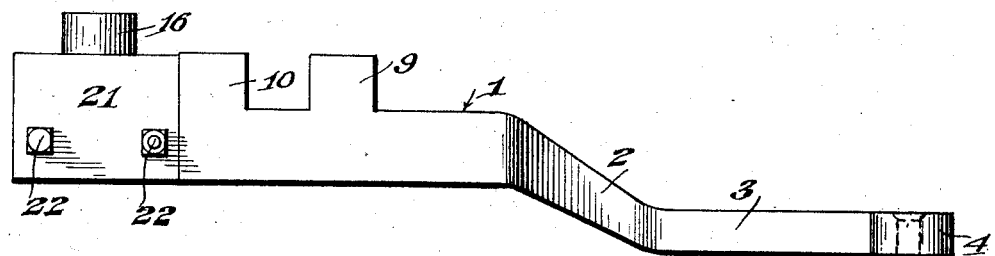
Figure 1 is a side elevation of the crank embodying this invention.
Figure 2:
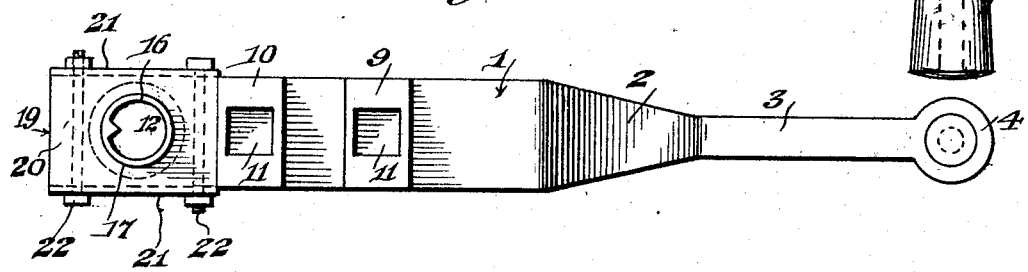
Figure 2 is a plan view of the same.

The other end of the shank 1 is relatively broad and flat as shown in Figure 2, and has formed between its outer end and the point of mergence with the constricted portion 2, a pair of integral, spaced lugs 9 and 10 respectively, the center of the base of each of which is socketed, as indicated at 11, and this socket may be square as shown or any other desired shape to engage a nut or bolt head.

Adjacent the outer end of the broad portion of the shank 1, a passage 12 is formed which extends through the shank as shown, and upon the upper face of the shank and sunk flush with the surface thereof, there is formed the annular series of ratchet teeth 13, which extend around the rim of the passage 12.

Coacting with the annular series of ratchet teeth 13 is a ratchet 14, having the teeth 15 which engage in the teeth 13 and extending from the ratchet 14 is a sleeve member 16, the overall diameter of which is less than the diameter of the ratchet 14. The internal diameter of the sleeve 16 is the same as that of the passage 12, and extending longitudinally of the inner side of the sleeve is an integrally formed ridge or key 17, which is adapted to engage in a keyway of a revoluble shaft, (not shown), in conjuction with which this crank is adapted to be used.

Surrounding the sleeve 16 and bearing against the ratchet 14 is a spiral spring 18, which is pressed down against the ratchet and is held in place about the sleeve by means of the three sided housing 19. As will be seen, this housing comprises a substantially elongated wide top portion 20, which covers the end of the shank 1 and one end of which bears against one side of the lug 10, and depending from this cross portion 20 of the housing are side skirts 21 which overlap the sides of the shank and to which they are secured by means of bolts 22, which pass through the shank.

From the foregoing description it will be readily seen that this crank is so constructed that it can be used upon a shaft in close work where it would be impossible to make a complete revolution of the shaft with a crank of ordinary construction, due to the ratchet carried at the outer end thereof. As before stated this crank is intended for use upon drilling machines which are often placed in close quarters, and as it sometimes happens that a drill becomes stuck it must be reversed to release it, it is only necessary to slip the sleeve 16 from the thread bar which operates the drill and reverse the crank, slipping the thread bar in the passage 12, and in this manner a reversed ratchet action can be had.

Having thus described my invention, what I claim is:—

1. In a crank of the character set forth, a shank having an aperture through one end thereof, a handle, ratchet teeth formed flush in the face of said shank around the rim of said aperture, a ratchet coacting with said teeth, and a tubular sleeve carried by said ratchet in alignment with said passage.

2. In a crank of the character set forth, a shank having an aperture through one end thereof, a handle, ratchet teeth formed flush in the face of said shank around the rim of said aperture, a ratchet coacting with said teeth, a tubular sleeve carried by said ratchet in alignment with said passage, and a spring element normally forcing said ratchet into engagement with said teeth.

3. In a crank of the character set forth, a shank having an aperture through one end thereof, a handle, ratchet teeth formed flush in the face of said shank around the rim of said aperture, a ratchet coacting with said teeth, a tubular sleeve carried by said ratchet in alignment with said passage, and a housing enclosing a portion of said apertured end and surrounding said sleeve to retain the same in position.

4. In a crank of the character set forth, a shank having an aperture through one end thereof, a handle, ratchet teeth formed flush in the face of said shaft around the rim of said aperture, a ratchet coacting with said teeth, a tubular sleeve carried by said ratchet in alignment with said passage, a housing enclosing a portion of said apertured end and surrounding said sleeve to retain the same in position, and a spring element surrounding said sleeve and confined in said housing and acting to normally maintain said ratchet in engagement with said teeth.

In testimony whereof, I affix my signature hereto.

JOHN A. JOHNSON.